Oct. 29, 1940.  M. P. WINTHER ET AL  2,220,032
ELECTROMAGNETIC APPARATUS
Filed March 17, 1938   7 Sheets-Sheet 4

Patented Oct. 29, 1940

2,220,032

UNITED STATES PATENT OFFICE 2,220,032

ELECTROMAGNETIC APPARATUS

Martin P. Winther, Waukegan, Ill., and Mark Kindt, Kenosha, Wis., assignors to Martin P. Winther, as trustee Application March 17, 1938, Serial No. 196,346

28 Claims. (Cl. 188—104)

This invention relates to electromagnetic apparatus including dynamometers and the like, and with regard to certain more specific features, to electrical dynamometers of the induction type.

This invention is an improvement upon the invention disclosed in the United States patent of Anthony Winther, No. 2,106,542, dated January 25, 1938.

Among the several objects of the invention may be noted the provision of means for substantially increasing absorption capacity by improved cooling means; the provision of improved circulation for a cooling medium which is independent of the position of the machine and in which the cooling channels are improvedly related to the regions of eddy-current generation in said stator; the provision of apparatus of the class described providing for relatively large expansion of portions carrying heavy eddy-currents without the production of deleterious stresses and without deleterious deformation; the provision of cooling elements which are removable and which may be easily cleaned; and the provision of effective ventilation. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention.

Similar reference characters indicate corresponding parts throughout the several views of the drawings.

Referring to Patent No. 2,106,542, there is described therein a type of eddy-current or induction dynamometer having very desirable characteristics, so far as is concerned the great ability to absorb power. The present invention consists of means for greatly increasing the power absorption rate of said dynamometer, as well as to add greatly to the ease of maintenance of the machine. The improvements lie in magnetic, as well as physical, means.

Figure 1:
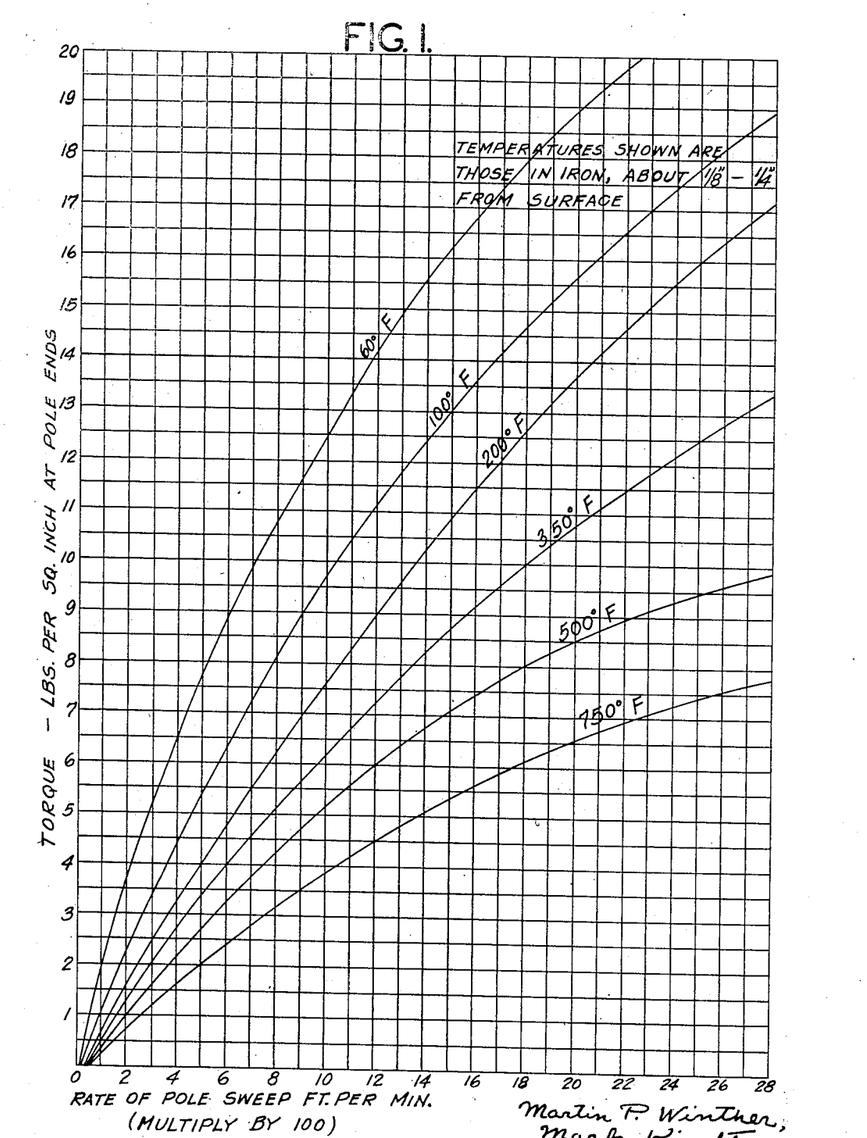
Fig. 1 is a series of curves showing the effect of temperature upon the torque produced by eddy-current dynamometers.

Referring to Fig. 1, it will be seen that if rate of pole sweep (in feet per minute) is plotted against torque (in pounds per square inch of pole ends), then the torque substantially increases with reduction in temperature. This is an indication, in the case of a high temperature, that not enough heat energy is being abstracted from the dynamometer to permit the maximum absorption of energy from the source of which the dynamometer is capable. The indication under the low temperature conditions is that heat energy is being carried away from the dynamometer fast enough to provide for greater absorption of energy from the source by the dynamometer.

Stated otherwise, the dynamometer temperature should be kept low by a rapid extraction of heat energy therefrom, in order that the temperature head between the heat transfer fluid and the heat absorption regions of the dynamometer may be as high as possible, so that energy transfer may be rapid from the heat absorption region to the heat transfer fluid. The present invention provides for obtaining or approaching optimum conditions such as shown by the highest curve in Fig. 1.

Figure 2:
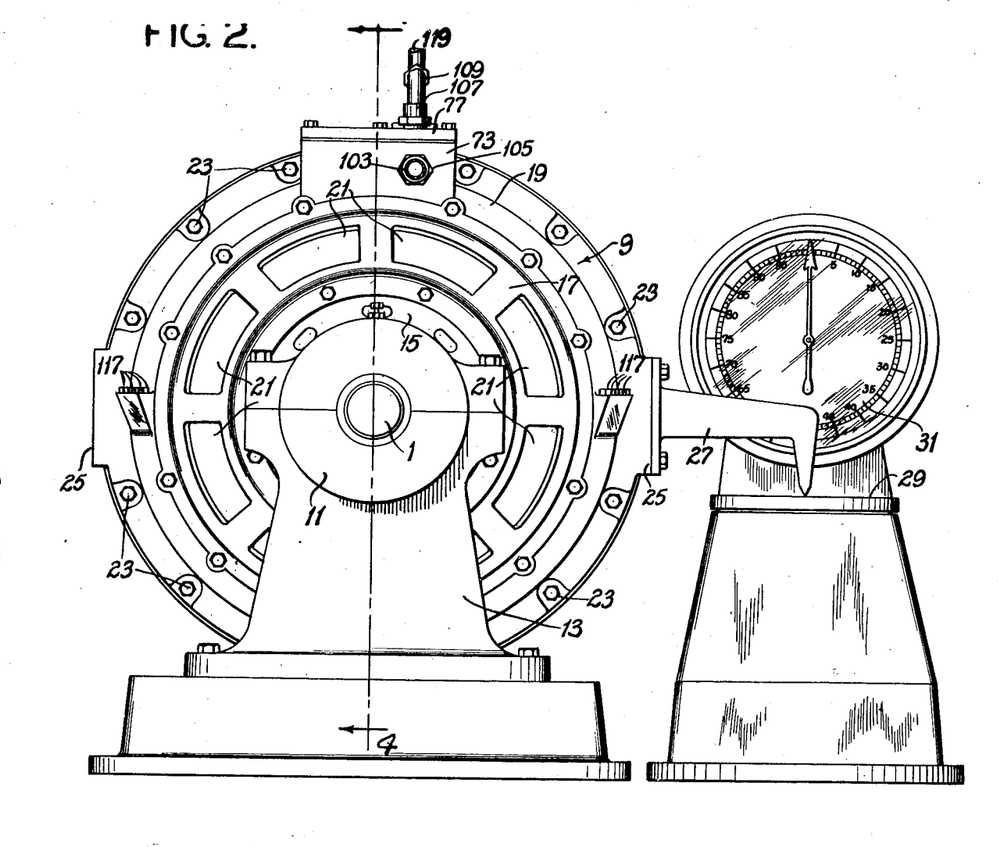
Fig. 2 is an end elevation of a dynamometer incorporating the invention.
Figure 3:
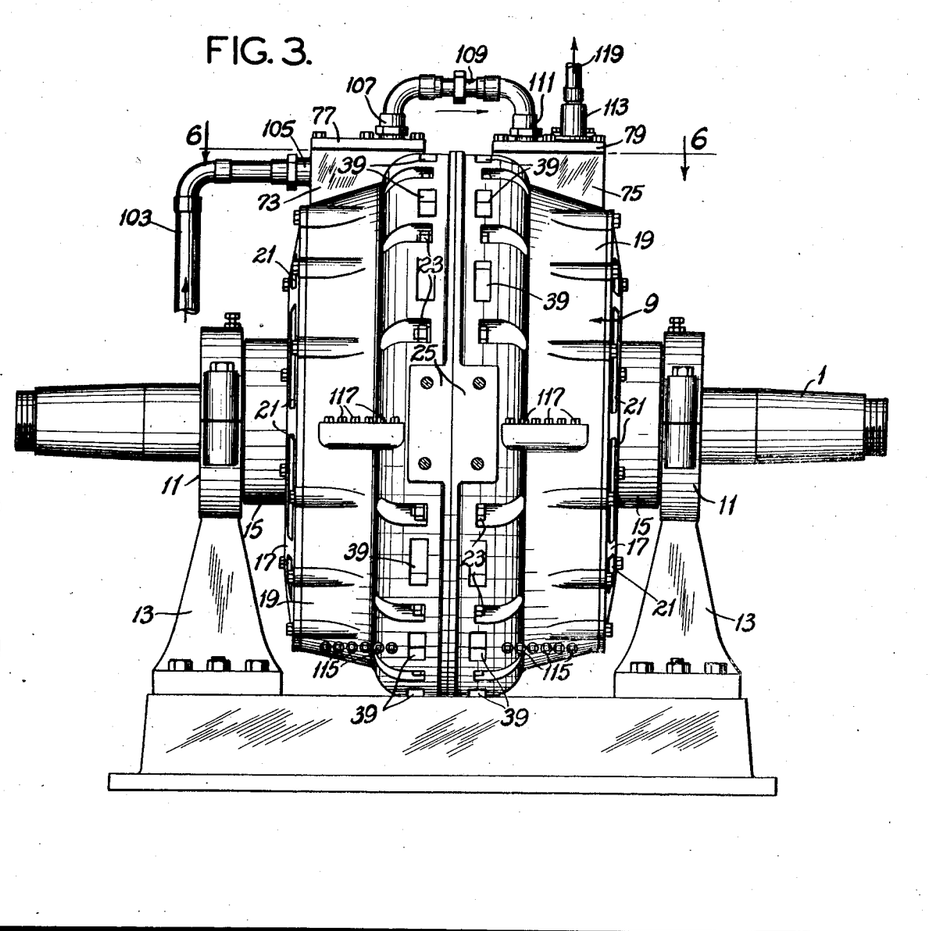
Fig. 3 is a side elevation of the dynamometer with the force measuring apparatus removed.
Figures 4, 9:
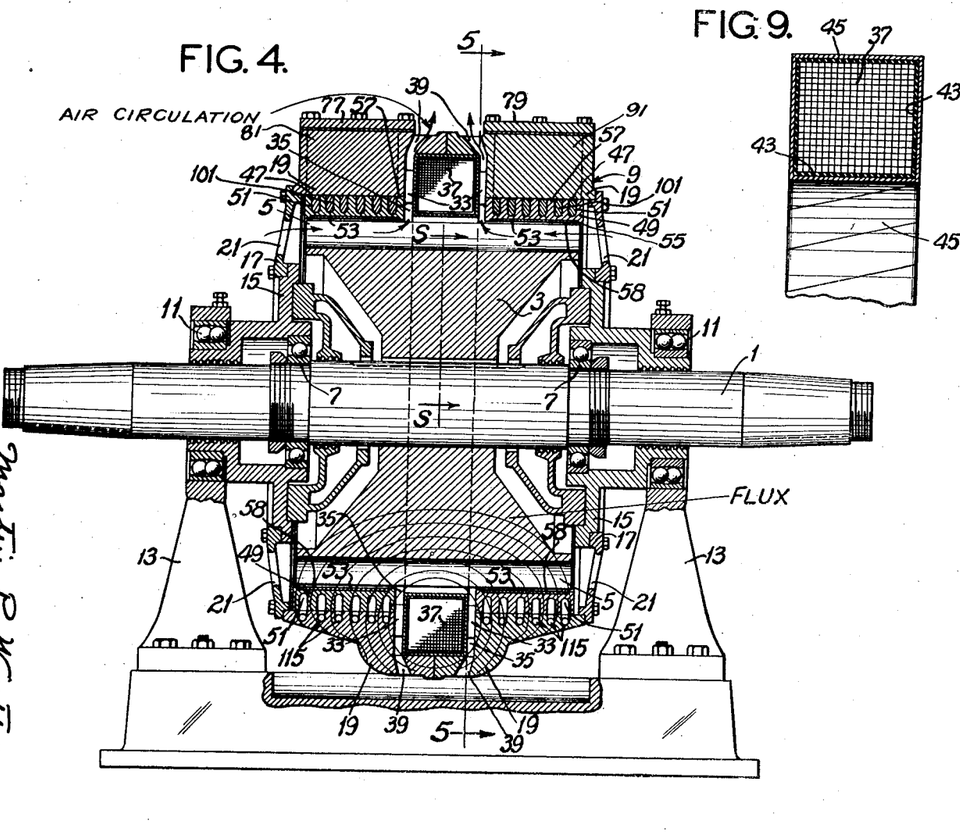
Fig. 4 is a longitudinal section of the dynamometer taken on line 4—4 of Fig. 2.
Fig. 9 is an enlarged detailed section of an electromagnetic coil.
Figure 5:
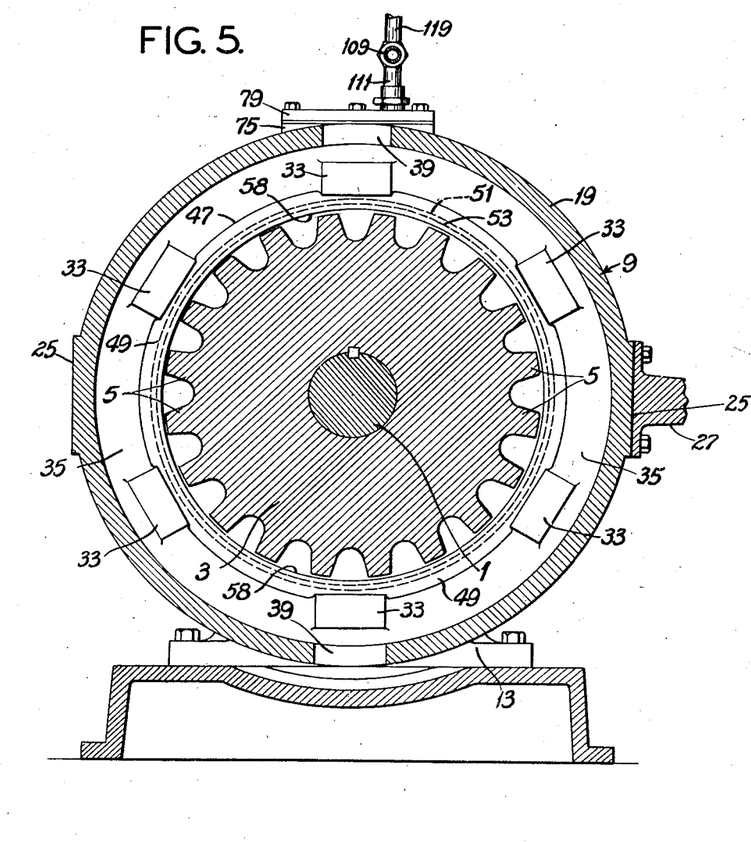
Fig. 5 is a vertical section taken on line 5—5 of Fig. 4.

The class of dynamometer generally referred to herein is shown in Figs. 2-4, in which a drive shaft 1 supports a keyed rotor 3. The rotor 3 has peripheral flux-concentrating teeth 5 (see also Fig. 5). The shaft 1 is carried in bearings 7 of a swinging stator case 9, the latter being supported on bearings 11 in pedestals 13. The stator 9 functions as an inductor.

The numeral 9 indicates the stator case generically. Specifically, the case has heads 15 which are connected by means of brass spiders 17 with outer castings 19. The spiders 17 have a plurality of openings 21 for ventilation purposes, to be further particularized.

The casting 19 is made in two parts, as indicated, which are held together by bolts 23, and are provided with outside pads 25, either one of which may have fastened thereto the torque arm 27 which presses upon the platform 29 of a force measuring scale 31. The scale is for the usual purpose of obtaining a force measurement for the calculation of power.

The two castings 19 are provided with oppositely spaced holding pads 33 in spaces 35. The purposes of these pads 33 is to hold in position in the spaces 35 an electromagnetic coil 37. The spaces 35 are connected with the exterior by circulation ports 39. The members 19 being cylindric provide a connection interiorly between spaces 35 and the spaces between the teeth 5. Thus, when the rotor 3 turns, the polarizing teeth 5 also function as centrifugally operating fan blades to draw air into the openings 21, along the space between teeth 5, and out through the openings 35 and 39 to the outside. This provides ventilation for the coil 37. The circulation is illustrated by arrows in Fig. 4.

As illustrated in Fig. 9, the coil 37, which is made of peripherally wound wire, each strand being insulated from the adjacent one, is exteriorly taped with insulating material 43 and around this is wound copper ribbon 45. The resulting copper sheath 45 completely encloses the coil so that if any excess heat disturbs the taping 43 on the coil 45, or the insulation on the wires, the copper prevents the tape from disintegrating, upon charring (if this should occur), and from falling into the machine. Thus, the useful life of the coil is much prolonged under overloading or the like.

The purpose of the coil 37 is, under conditions of electrical excitation thereof, to generate a toric flux field which passes through the inductors 19 and through the rotor 3, the field being distorted or concentrated by the teeth 5, so that upon rotation of the rotor 3, eddy-currents are induced in the stator 9. These eddy-currents set up a magnetic reaction, whereby the rotor 3 tends to drive the swinging stator 9, which applies force through the arm 27 to the scale platform 29. At the same time heat is generated which must be carried away.

Heretofore, the inductor members of dynamometers have been simply made of solid castings wherein cored passages have been included for circulation of cooling fluid. Such dynamometers have had their maximum capacity limited by the distortion that was caused by heating. These distortions were of such a degree that excessive clearances were necessitated between the rotors and stators, which in turn cut down the capacity because of the large magnetic gap thus made necessary. As shown in said Patent 2,106,542, the cooling passages for cooling water have been cast. Furthermore, attention was not particularly directed to the relationship between cooling fluid passages and the eddy-current regions of the machine.

Figure 10:
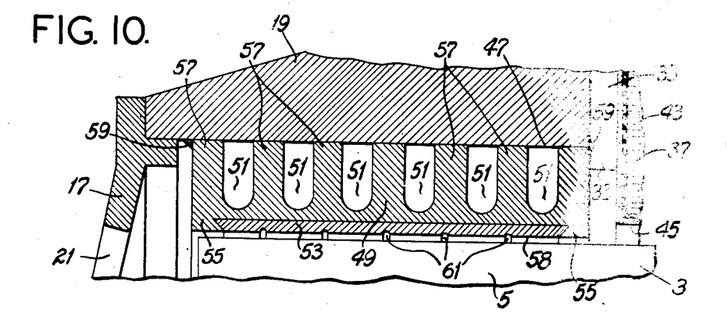
Figs. 10, 11 and 12 are enlarged fragmentary details of various modifications of cooling rings.

Referring to Figs. 4 and 10, it will be seen that each casting 19 is internally cylindrically machined, as shown at numeral 47.

There is provided a rolled steel forged stator ring 49 which is outwardly machined as a cylinder to have a slip fit with respect to the inner cylinder 47 of each member 19. This ring is exteriorly provided with grooves 51 which, with the inside cylinder 47, form water passages.

Figure 11:
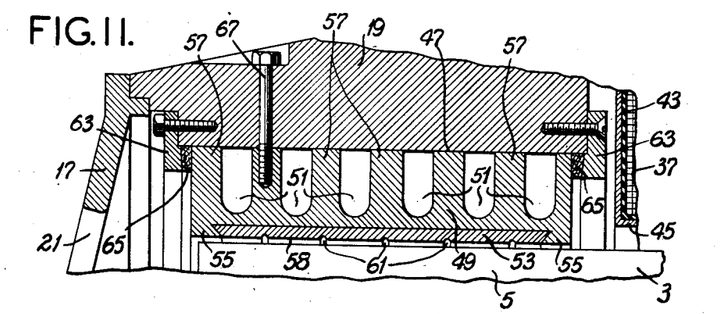

Interiorly, each ring 49 is preferably provided with a thin copper insert or inlay 53. This insert 53 is a class example of any conductor of lower electrical resistance than the ring 49. Equivalents are aluminum, electrolytic iron, or the like. Inasmuch as the conducting insert 53 is to carry a substantial amount of eddy-current and transform the energy thereof into heat to be delivered to water in the passages 51, it is important that the bond between the insert 53 and the steel ring 49 be as perfect as possible for heat transmission. Autogenous attachment is best, as for example, the insert 53 may be attached to the ring 49 by means of silver solder. Since, however, silver solder is not of great enough strength to prevent the insert 53 from drawing away from the ring 49, we prefer to hold the ends thereof by rolling in the steel of the ring 49 as shown at 55 (Figs. 10 and 11). After assembly of the parts 53 and 49, they are cylindrically machined interiorly at a suitable clearance from the teeth 5 of the rotor 3.

It should be here understood that the use of the insert 53 increases the capacity of the machine, but that the other improvements described herein are per se effective independently of said insert.

Whether or not the insert 53 is used, the distance between the bottoms of the grooves 51 to the inner machined surfaces 58 should be of the order of ⅜" to ¾" for the reason that it is in a region of this depth from surface 58 that most of the eddy-currents occur and in which energy conversion to heat is effected. Consequently, much of the heat in the cylinder 49 is in the ⅜" to ¾" skin thickness, and it is important to have water available adjacent this region to carry away the heat. The walls 57 between grooves 51 serve to carry flux from the coil 37.

The ⅜" value has been determined to be mechanically a sound one, using present-day materials, but it is clear that if it be desired, this dimension may be less, because both eddy currents and heating occur within the ⅜" boundary, as well as between that boundary and the ¾" boundary.

The number of grooves and their width should preferably be such as to make their combined axial dimensions equal to an amount between ⅓ and ⅔ of the active magnetic length of the ring 49. If this length is substantially less than ⅓, not enough cooling area is effective, and if the length is substantially greater than ⅔, not enough flux transmission area is provided. Likewise, if the grooves are too deep or too wide, water is needlessly wasted in circulation and velocity is reduced. For example, the depth of each groove should not be more than the order of 2¼ times the width.

In order to hold the rings 49 in place, they may be welded as shown at numeral 59, and when it becomes necessary to remove such rings, the welding 59 may be machined out of the body 19.

Since the inner cylindric surface 58 is the one most distant from the cooling-water passage 51, it is subjected to the greatest heating and heretofore has been the one that has had the most tendency to buckle, under overload heating conditions, even to the extent of interfering with the teeth 5 of the rotor, and even to the extent of causing leakage cracks extending to the cooling water channels in cases where the insert 53 is not used. To prevent this, relief grooves 61 are machined inside of the insert 53 (if the insert be used), and when the insert is not used, these grooves 61 are placed on the inside surface of the steel rings 49. These grooves relieve the expansion stresses by providing axial space for endwise strains and thus they prevent inward bulging toward the teeth 5. The grooves are not shown in Fig. 4, because of their small scale therein. They are shown in Figs. 10 and 11.

By the above means, a much smaller clearance may be maintained between the teeth 5, and the inner cylindric surface 58, and thus the magnetic gap may be reduced and the capacity increased.

The use of the separate ring 49 itself has various advantages. These rings are to be machined from the softest rolled steel available, formed by forging rough rings and then machining all surfaces, including the groove 61 (in cases where an insert 53 is not used). The forgings have the advantage that the steel is compacted and made homogeneous, the same being finally annealed so as to eliminate all stresses, leaving the steel as soft as possible, so that its magnetic qualities as a conductor of flux are high, and its electrical resistance to the passage of eddy-currents is low. Furthermore, the forged steel is more pliable than a cast material and adjusts itself readily to changes in temperatures and conducts heat at a much higher rate than a cast steel or cast iron untreated ring.

Various other means may be used for obtaining a stator ring 49 which is of proper homogenized magnetic characteristics. Forged iron or steel may be used, or, the rings may be composed of cast steel and subsequently rolled or forged and annealed so as to homogenize the metal.

In Fig. 11 is shown a modified form of that which is shown in Fig. 10, in which like numerals designate like parts. In this case, the ring 49, instead of being welded in place, is held by shrouds 63. Between the shrouds 63 and the ring 49 are packing rings 65. One or more studs 67 serve to prevent relative motion between the rings 49 and the containing casting 19.

Figure 12:
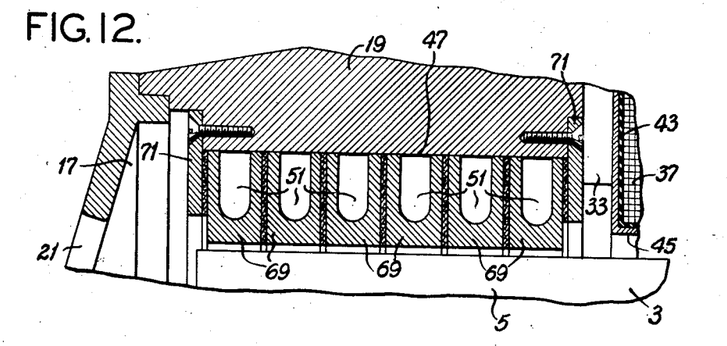

In Fig. 12 is shown another alternative form, in which like numerals designate like parts. In this case, there are substituted for the ring 49 disc-like rings 69, each one of which carries a water cooling passage or groove 51. A group of these rings are held in place by means of shrouds 71. Packing is used between the shrouds and the endwise rings and between rings. In this form of the invention, the inner grooves 61 are not necessary, because the packed space between rings serves as a mechanical equivalent. Furthermore, although it is conceivable that the insert 53 might be used in connection with the rings 69, it has not been shown in Fig. 12. Hence Fig. 12 serves not only to illustrate the multi-ring assembly, but also the fact that, if it is desired to sacrifice some reduction in efficiency to a more economical construction, the insert 53 may be omitted. It is to be understood that this omission may also be made in the other forms of the invention disclosed, if desired.

In both constructions of Figs. 11 and 12, the packing rings may be made of any suitable material, such as asbestos. The locking bolts 67 should be of the non-rusting variety.

We have found in former machines of this class that the capacity is seriously cut down by magnetic leakage which occurs from the ends of the rotor 3. Such leakage is aggravated by the tendency for flux to follow the shaft 1, and then the path through the end supports to the stator. For this reason, we have caused the end plate spiders 17 to be made of brass or other non-magnetic material. Thus, leakage is inhibited.

From Fig. 4 it will be seen that the opposite inductors 19 each carry one of the rings 49 (of Fig. 10 or 11) or group of rings 69 (of Fig. 12). Each ring is in the flux circuit generated by the coil 37. We have found an optimum relation should exist between the effective flux carrying (and hence flux generating) capacity of the machine, and the cooling surfaces of the rings 49 below passages 51.

For example, with a coil 37 of a given number of ampere turns, if a relatively short ring 49 (or few rings 69) is used (with fewer grooves than shown in the drawings), the flux concentration becomes very great. With ring lengths such as shown in the drawings, the flux concentration is moderate. If ring lengths are relatively greater than those shown in the drawings, the flux concentration becomes rarefied at the outer ends of the rings.

In constructing rings of various lengths, as above described, we have discovered that the total torque of each machine is roughly the same in each case, provided advantage is taken of optimum forms of all parts in each case. However, in the case where the ring is relatively shorter than shown, the same work is done upon a narrower cooling surface at or near the inner face 58, which cannot carry away the heat as well as a wider surface. Also, since the flux which passes through the rotor 3 is determined by the iron or steel area available at section S—S in Fig. 4, it follows that there is a limit to the ratio of the cooling area in the stator to the flux carrying area of the rotor. Thus, whenever the rotor flux area is greater than fifty percent. of the stator cooling area at or near face 58, the cooling area is incapable of conducting away the heat generated, so that it may be said that, for every square inch of rotor flux area, there must be at least two square inches of stator cooling area.

By rotor flux area is meant the effective flux carrying area, or area from which flux emanates to enter the cooling ring 49. Thus, a rotor 3 may contain a large amount of unnecessary area through line S—S (Fig. 4), but that flux passing through the center part (as through the shaft 1) may leak out at the ends but may not enter the cooling rings 49.

Otherwise stated, for every unit area of flux in the rotor 3 capable of producing torque, there must be at least two unit areas of heat or energy absorbing surface on the insides of the rings 49. Thus, it will be seen that the rings 49 have an optimum inner cylindric area for a given size of rotor.

Another feature of the invention lies in the mode of circulating water through the passages 51. A split or parallel circulation of water around two sides of the casting, as is carried out in Patent 2,106,542, results in some tendency to favor one side of the machine with water flow while starving the other side. This is caused in part by casting irregularities (now avoided by the machined grooves 51), and in part by the necessary tilt of the dynamometer casing in pressing the arm 27 against the scale 29 (Fig. 2). Under these conditions, the cold incoming water had a tendency to select the low side. Thus, a larger percent. of the water flowed up one side and deprived the opposite side of sufficient cooling. Inasmuch as the heat generation is uniform over the entire case, steam would actually form on the starved side, despite the fact that the average temperature of the outpouring water might not be over 130° F. The steam pockets would permit the metal opposite them to rise in temperature, perhaps to the order of 1200° F. or higher, due to the thin skin of iron in which the eddy-currents occurred. These temperatures would cause the steel to check, or open up porous spots due to sudden cooling when the steam bubbles collapsed or passed away. Another difficulty was that since the heat is proportional to eddy-current generation and the latter is proportional to flux density, the iron near the coil such as 37 herein would become the hottest, thus causing damage to the coil, as well as metal cracking.

Figure 6:
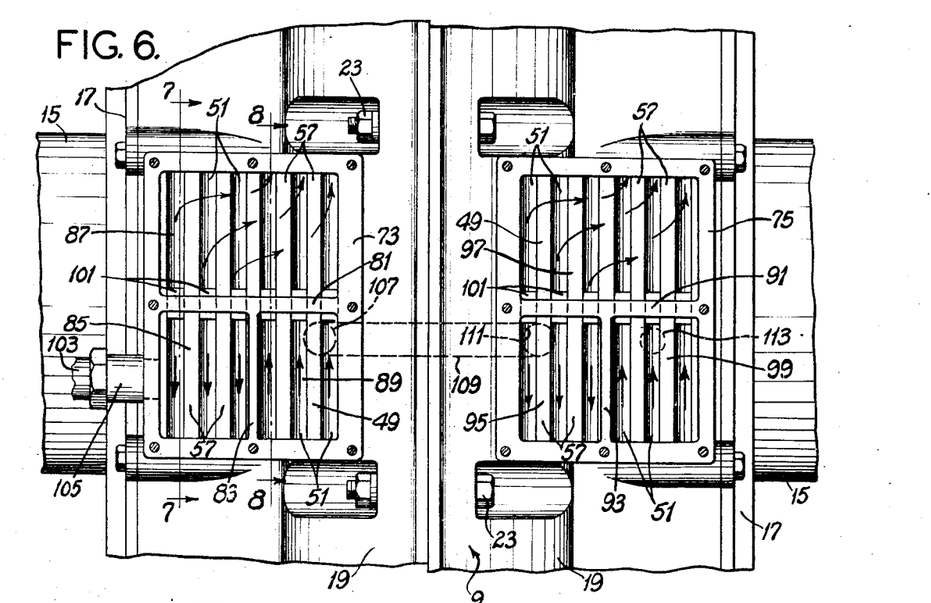
Fig. 6 is a horizontal section taken on line 6—6 of Fig. 3.
Figures 7, 8:
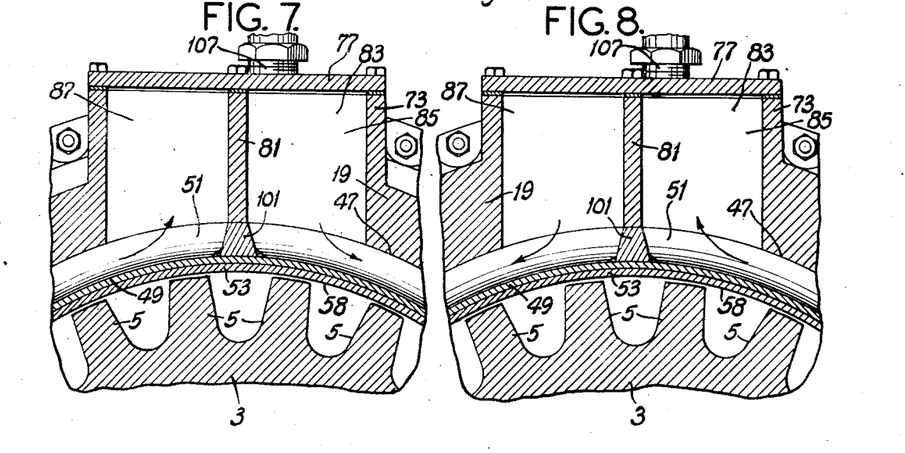
Fig. 7 is a fragmentary vertical section taken on line 7—7 of Fig. 6.
Fig. 8 is a view similar to Fig. 7 but taken on line 8—8 of Fig. 6.

The above difficulties have been obviated by the series water circulating means illustrated more particularly in Figs. 6–8, in connection with Figs. 3 and 4. These show how the stator castings 19 are formed at their upper proportions as boxes 73 and 75. These boxes have cover plates 77 and 79, respectively. The box 73 has a longitudinal wall 81 and a peripherally located or transverse wall 83. These divided the box into three compartments, 85, 87 and 89. Likewise, the box 75 has a longitudinal wall 91 and a peripheral wall 93 dividing the box into three compartments 95, 97 and 99.

In each of the grooves 51, at points below the walls 81 and 91 are fastened, as by welding, sealing blocks 101, which provide stationary dams below walls 81 and 91. It will be remembered that there is no relative motion between the rings 49 and the castings 19.

A cold-water supply pipe 103 supplies water to an inlet 105 of the compartment 85. Thus, the water may flow into the compartment 85 and clockwise around the number of channels 51 which communicate with the compartment 85 (three in the present example). This water comes up into the compartment 87 (Fig. 7), and escapes counterclockwise (Fig. 8) through the channels to the compartment 89. Here an outlet 107 communicates with a cross pipe 109 which in turn communicates with an inlet 111 for the inlet compartment 95 of the box 75. The water then runs a similar successive clockwise and counterclockwise course through compartment 95, passages 51 in the second ring 49, compartment 97 and compartment 99. It escapes in a heated condition at an outlet 113. The flow is generally indicated by the arrows in Fig. 6, except that these arrows are formalized, and actually the water coming from one of the channels 51, which is supplied from compartment 85, may flow through various ones of the channels 51 which communicate with the outlet compartment 89. The same is true of water flowing from compartment 95 to compartment 93 in box 75.

It will be seen from the above that the water does not split its circuit at the inlet and find its way over two routes around any given ring 49, but passes serially completely through any passage 51 which it enters. It also moves in series through the two rings 49. The result is that no one portion of any passage 51 is either favored or starved for cooling water regardless of the angular position of the stator 9. The result contributes to a highly efficient absorption of heat, which permits the efficient absorption of energy by the electrical components of the machine. A feature that should be noted in this connection is that the water is also forced to circulate through the machined steel rings, and inasmuch as these have a higher heat conductivity and better fluid transmitting surfaces than the castings heretofore used, adequate cooling is further favored.

It will be seen that the boxes 73 and 75 could be arranged so that water circulation could be in one direction around the stator between the time that it enters and leaves one box (the box 73, for example), and then it could be led through the pipe 109 to the other box and permitted to make a single loop (from and to box 75), either in the same direction, or in the opposite direction. This is suggested merely by way of illustrating the mechanical equivalents possible in this connection. Other series circuits are available.

Various waters, heavily charged with dissolved minerals, will precipitate these minerals at temperatures reach by this apparatus and far below the boiling point of water. As is clear from Fig. 6, boxes 73 and 75 at the top of the machine also provide access to the water cooling grooves 51 so that these grooves may be cleaned. Accordingly, flexible rods, such as are used by plumbers, may be forced through each groove after boiler compound or similar scale softening chemicals have been placed in the grooves to treat any scale which has been formed.

Furthermore, additional annularly placed cleaning holes 117 are provided as shown in Figs. 2 and 3. Individual drainage outlets 115 facilitate cleaning.

We have found that, in order to prevent the formation of steam pockets, it is advisable to use an automatic device for maintaining circulating pressure. This is accomplished by making the outlet tube 119 (associated with the outlet 113) smaller in diameter than the inlet 105 or other flow sections through the apparatus. This outlet tube therefore operates automatically to increase the internal and discharge pressure as the inlet pressure is increased.

By means of the above improvements, we have been able, in the case of a dynamometer with a 10" rotor, to obtain absorption of 110 H. P. at 1000 R. P. M., as against 75 H. P. formerly; and 450 H. P. at 4000 R. P. M., as against 300 H. P. Furthermore, continuous operation is now possible at 450 H. P., as against only 65 H. P. heretofore.

It will be seen that, although the above principles are applied to a dynamometer construction, they apply equally well to any construction wherein the apparatus is used for water heating, mechanical energy being absorbed for this purpose. That is to say, the improvements have the effect of rendering more efficient the conversion of mechanical work into heat and are therefore applicable to cases where the heat is used, as well as to the case disclosed, wherein it is thrown away.

Likewise, some of the features, such as for example the brass end rings for preventing flux leakage, are applicable to other inductive apparatus of this class, such as for example inductor power transmissions or clutches wherein the member that corresponds to the stator 9 herein is permitted to rotate.

While the invention is shown as used in association with a rotor having teeth such as 5, it is applicable at least in part to rotors carrying salient poles wherein the exciter windings are upon the poles.

The term autogenous is used herein to describe continuous metal connections generally, as for example those made by welding, soldering, fusion and the like.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

We claim:

1. In apparatus of the class described, a stator, an inner stator ring in the stator, said ring carrying at least one peripheral water passage which per se is exteriorly open and interiorly closed, said exterior opening being closed when the ring is positioned in the stator, said ring having spaced grooves on its inner face.

2. In apparatus of the class described for converting work into heat comprising a rotor member, a stator member, flux concentrating means on one of said members, the face of the other member being relatively smooth and close to said flux concentrating means, and peripheral grooves in said smooth face to provide for absorbing strain caused by heating stresses, without substantial buckling toward the adjacent member.

3. In apparatus of the class described for converting work into heat comprising a rotor member, a stator member, flux concentrating means on one of said members, the face of the other member being relatively smooth and close to said flux concentrating means, and a relatively thin sheet of material at said smooth face which is of conductivity higher than the material in the member which carries it.

4. In apparatus of the class described a rotor, flux concentrating means thereon, a stator, a forged steel ring in said stator, said ring having a smooth face adjacent the rotor and providing circulating passages for a cooling medium, and a relatively thin insert in said ring, said insert being composed of material of higher conductivity than said forged steel.

5. In apparatus of the class described for converting work into heat comprising a rotor member, a stator member, flux concentrating means on one of said members, the face of the other member being relatively smooth and close to said flux concentrating means, and a relatively thin sheet of material in said smooth face which is of conductivity higher than the remaining material in the member which carries it, said insert having peripheral grooves therein.

6. In apparatus of the class described a rotor, flux concentrating means thereon, a cast stator, a homogenized insert ring in said stator of material such as steel and circulating passages for a cooling medium, a relatively thin insert in said ring, said insert being composed of materials of higher conductivity than said rolled steel, such as copper, said peripheral grooves of the insert being adapted to relieve endwise strain caused by heating stresses.

7. In apparatus of the class described a rotor, flux concentrating means thereon, a stator, a rolled steel insert in a ring in said stator providing circulating passages for a cooling medium, a relatively thin insert in said ring presenting a smooth face to the flux concentrating means, said insert being composed of materials of higher conductivity than said rolled steel, and means for obtaining an autogenous connection between said insert and said ring.

8. In apparatus of the class described, a rotor, a stator a separate ring in said stator and adjacent the rotor, said ring providing passages for the cooling medium, clamping means for holding the ring to the stator, and packing means between the clamping means and said ring.

9. In apparatus of the class described, a rotor, a stator, a plurality of separate inner stator rings within said stator, means for clamping said rings endwise, and packing means between adjacent rings, each ring being recessed to provide a separate channel for a cooling medium.

10. In apparatus of the class described, a rotor, flux concentrating means on the rotor, an adjacent stator, such stator having a relatively smooth peripheral face adjacent said flux concentrating means and at a relatively small distance therefrom, said stator having peripheral recesses for relieving axial strains engendered by stresses due to heating, whereby radial bulging is minimized.

11. In apparatus of the class described, a rotor, a stator, a peripheral coil in the stator and encircling the rotor, said coil providing a toric flux field interlinking the rotor and stator, said stator being composed of two units providing space for the coil, means for holding said units together, said space providing for ventilation about the coil, and pad means in the stator for supporting the coil at spaced intervals of contact.

12. In apparatus of the class described, a stator comprising two adjacent rings shaped to provide space therebetween, means for joining said rings, a peripheral coil in said space, the space being large enough to provide for ventilation about the coil, and pad means associated with said rings providing spaced supporting contacts with the coil.

13. In apparatus of the class described, a stator comprising two circular rings shaped to provide adjacent spaces, means for joining said rings whereby said spaces provide a single peripheral space, a peripheral coil in said space, the space being large enough to provide for ventilation about the coil, pad means associated with said rings providing for spaced supporting contacts with the coil, and a rotor interiorly associated with said ring, said rotor having flux concentrating teeth between which are spaces through which air may pass to the coil, said spaces between the rings having outlet means, whereby air circulation may be established by said rotor.

14. In apparatus of the class described, a stator, means for generating eddy-currents in the stator to heat the same, said stator having a peripheral groove, means for circulating a cooling medium through said groove comprising a dam in the groove, means for introducing the cooling medium on one side of the dam, and means for removing the cooling medium from the groove at an adjacent point on the other side of the dam.

15. In apparatus of the class described, a stator, means for generating eddy-currents in the stator to heat the same, said stator having a plurality of peripheral grooves, means for circulating a cooling medium in parallel through said grooves comprising a dam in each groove, means for introducing the cooling medium at a region on one side of the dams, and means for removing the cooling medium from the grooves at an adjacent region on the other sides of the dams.

16. In apparatus of the class described, a stator of circular form, said stator having an inner surface region adjacent which eddy-currents are induced and in which heating occurs, a plurality of sets of individual peripheral fluid circulating passages adjacent said heating region, and means for introducing, controlling and removing the heating fluid in said passages so that the fluid passes substantially completely around one set of passages in one angular direction and completely around an adjacent set of passages in an opposite angular direction.

17. In apparatus of the class described, a rotor, flux concentrating means on the rotor, a stator, a peripheral coil in the stator providing a toric field interlinking the rotor and the stator, said stator having peripheral fluid passages near its inner surface adjacent the rotor, a group of passages being located on each side of said coil, means for introducing water to the passages on one side of the coil and substantially completely encircling said stator, means for transferring water that has so circulated to the other side of the coil, and means for circulating said water peripherally around the stator on the other side of the coil and exhausting the same.

18. In apparatus of the class described, a rotor, flux concentrating means on the rotor, a stator, said stator having peripheral fluid passages near its inner surface adjacent the rotor, means for introducing water to certain of the passages and completely encircling said stator, means for transferring water to others of said passages, and means for circulating said water peripherally around the stator through the last-named passages and exhausting the same.

19. In apparatus of the class described, a rotor, flux concentrating means on the rotor, a stator, said stator having peripheral fluid passages near its inner surface adjacent the rotor, means for introducing water to certain of the passages and completely encircling said stator, means for transferring water to others of said passages, means for circulating said water peripherally around the stator through the last-named passages and exhausting the same, and means for forcing said water to move both clockwise and counterclockwise during its passage through the machine.

20. In apparatus of the class described, a rotor, flux concentrating means on the rotor, a stator, a peripheral coil in the stator providing a toric field interlinking the rotor and the stator, said stator having peripheral fluid passages near its inner surface adjacent the rotor, a group of passages being located on each side of said coil, means for introducing water to the passages on one side of the coil and completely encircling said stator, means for transferring water that has so circulated to the other side of the coil, and means for circulating said water peripherally around the stator on the other side of the coil and exhausting the same, the water flowing through passage on one side of the coil moving at least part of the time in a direction which is opposite to the angular direction of motion on the other side of the coil.

21. In apparatus of the class described, a stator having peripheral water circulating passages, entry boxes associated with the stator and communicating with said passages and permitting the insertion of flexible cleaning members.

22. In apparatus of the class described, a stator having peripheral water circulating passages, entry boxes associated with the stator and communicating with said passages and permitting the insertion of flexible cleaning members, and individual openings for inserting said cleaning members at points spaced from said boxes.

23. In apparatus of the class described, a stator having peripheral water circulating passages, entry boxes associated with the stator and communicating with said passages and permitting the insertion of flexible cleaning members, individual openings for inserting said cleaning members at points spaced from said boxes, and drain means from said passages.

24. In apparatus of the class described, a rotor member, a stator member, means for magnetically coupling the rotor member and the stator member, one of said members being provided with flux-concentrating means, a separate element associated with the other member adjacent the flux concentrating means providing passages for heat-transferring fluid, said means for effecting a magnetic coupling comprising a coil in one of the members, and means for ventilating the coil through passages running through said last-named member to the atmosphere.

25. In apparatus of the class described, a relatively movable flux-concentrating member, an inductor, said inductor comprising a main body portion substantially spaced from the flux-concentrating member, an intermediate member composed of a homogenized material such as mechanically worked soft steel, said intermediate member being carried by the main body portion and located between the main body portion and the flux-concentrating member and having a face closely adjacent the latter, said intermediate member receiving flux from the flux-concentrating member and at least in part defining cooling passages, said face of the intermediate member being relatively smooth and relieved by strain-reducing recesses.

26. In apparatus of the class described, a relatively movable flux-concentrating member, an inductor, said inductor comprising a main body portion substantially spaced from the flux-concentrating member, an intermediate member composed of a homogenized material such as mechanically worked soft steel, said intermediate member being carried by the main body portion and located between the main body portion and the flux-concentrating member and having a face closely adjacent the latter, said intermediate member receiving flux from the flux-concentrating member and at least in part defining cooling passages, said face of the intermediate member being relatively smooth and relieved by recesses and being composed of a thin cylindric insert of a relatively high conductive material.

27. In apparatus of the class described, a rotor member, a stator member, means for magnetically coupling the rotor member and the stator member, one of said members being provided with flux-concentrating means, a separate element associated with the other member adjacent the flux-concentrating means providing passages for heat-transferring fluid, the means for effecting a magnetic coupling comprising a coil in one of the members, and means for ventilating the coil.

28. In apparatus of the class described, an inner rotor and an outer stator, means for magnetically coupling the rotor and the stator, the rotor being provided with flux-concentrating means, a separate element attached to the stator and located between the rotor and stator and being adjacent the flux-concentrating means and providing passages for heat-transferring fluid, said means for effecting a magnetic coupling comprising a coil in the stator, and means for ventilating said coil.

MARTIN P. WINTHER.
MARK KINDT.